(12) United States Patent
Chan et al.

(10) Patent No.: US 8,830,337 B2
(45) Date of Patent: Sep. 9, 2014

(54) ELECTRONIC DEVICE WITH CAMERA FUNCTIONS

(75) Inventors: Po-Wen Chan, Tainan (TW);
Kuo-Liang Tai, Tainan (TW)

(73) Assignee: Himax Imaging Limited, Tainan (TW)

( * ) Notice: Subject to any disclaimer, the term of this patent is extended or adjusted under 35 U.S.C. 154(b) by 115 days.

(21) Appl. No.: 13/603,312

(22) Filed: Sep. 4, 2012

(65) Prior Publication Data

US 2014/0063322 A1   Mar. 6, 2014

(51) Int. Cl.
*H04N 5/228* (2006.01)

(52) U.S. Cl.
USPC ...................................... 348/208.8

(58) Field of Classification Search
USPC ................ 348/208.8, 326–327, 337
See application file for complete search history.

(56) References Cited

U.S. PATENT DOCUMENTS

| 2006/0098284 | A1* | 5/2006 | Aastuen et al. | 359/487 |
| 2009/0009650 | A1* | 1/2009 | Liu et al. | 348/340 |
| 2009/0111512 | A1* | 4/2009 | Demuynck | 455/556.1 |
| 2012/0154621 | A1* | 6/2012 | Kuo et al. | 348/222.1 |

* cited by examiner

*Primary Examiner* — Mekonnen Dagnew
(74) *Attorney, Agent, or Firm* — McClure, Qualey & Rodack, LLP (57) ABSTRACT

An electronic device with camera functions includes a housing and a camera module. The housing has a first opening and a second opening. The first opening is disposed on a display surface of the housing, and the second opening is disposed on a rear surface of the housing. The camera module is located between the first opening and the second opening. Therefore, a user can take a photograph for an object by the display surface or the rear surface of the electronic device facing toward the object.

8 Claims, 7 Drawing Sheets

ELECTRONIC DEVICE WITH CAMERA FUNCTIONS

BACKGROUND OF THE INVENTION

1. Field of the Invention

The invention relates to an electronic device, and in particular, to an electronic device with camera functions.

2. Description of the Related Art

Because of the improvement of communications technology, mobile phones now have a main camera module for a camera and a sub-camera module for video communications. In general, the main camera module has a lens disposed on a rear surface of the mobile phone, and the sub-camera module has a lens disposed on a display surface of the mobile phone. A user can use the main camera module to take a photograph for others, or use the sub-camera module for video communications.

However, since two camera modules are installed in one mobile phone, the manufacturing cost and difficulty of assembly increases, and product yield rate decreases.

BRIEF SUMMARY OF THE INVENTION

To solve above problems of the prior art, the object of the invention is to provide an electronic device with camera functions. The electronic device utilizes one camera module, and a user can take a photograph for an object by the display surface or the rear surface of the electronic device, which faces toward the object.

For the above objective, an electronic device with camera functions includes a housing and a camera module. The housing includes a first opening and a second opening. The camera module is disposed in the housing. The camera module includes a first polarization converter, a second polarization converter, a reflecting element, and an image sensor. The first polarization converter is adjacent to the first opening and converts a first light beam to an S-polarized light beam. The second polarization converter is adjacent to the second opening and converts a second light beam to a P-polarized light beam. The reflecting element is located between the first polarization converter and the second polarization converter. The image sensor is disposed in the housing. The reflecting element reflects the S-polarized light beam and the P-polarized light beam to the image sensor.

For the above objective, an electronic device with camera functions includes a housing and a camera module. The housing includes a first opening and a second opening. The camera module is disposed in the housing. The camera module includes a reflecting element and an image sensor. The reflecting element is rotatably located between the first opening and the second opening. The reflecting element includes a first reflecting surface and a second reflecting surface opposite to the first reflecting surface. The image sensor is disposed in the housing. A first light beam is emitted to the reflecting element via the first opening, and a second light beam is emitted to the reflecting element via the second opening. When the first reflecting surface of the reflecting element faces to the first opening and the image sensor, the reflecting element reflects the first light beam to the image sensor. When the second reflecting surface of the reflecting element faces to the second opening and the image sensor, the reflecting element reflects the second light beam to the image sensor.

For the above objective, an electronic device with camera functions, includes a housing and a camera module. The housing includes a first opening and a second opening. The camera module is disposed in the housing. The camera module includes an image sensor and a reflecting element. The image sensor is disposed in the housing. The reflecting element selectively reflects a first light beam from the first opening to the image sensor, or reflects a second light beam from the second opening to the image sensor. The first opening is positioned on a first side of the housing, and the second opening is positioned on a second side of the housing opposite to the first side.

In conclusion, a user can take a photograph for an object by the display surface or the rear surface of the electronic device, which faces toward an object. Since the electronic device has only one camera module, the manufacturing cost and the difficulty of assembly may be decreased, and the product yield rate may be increased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
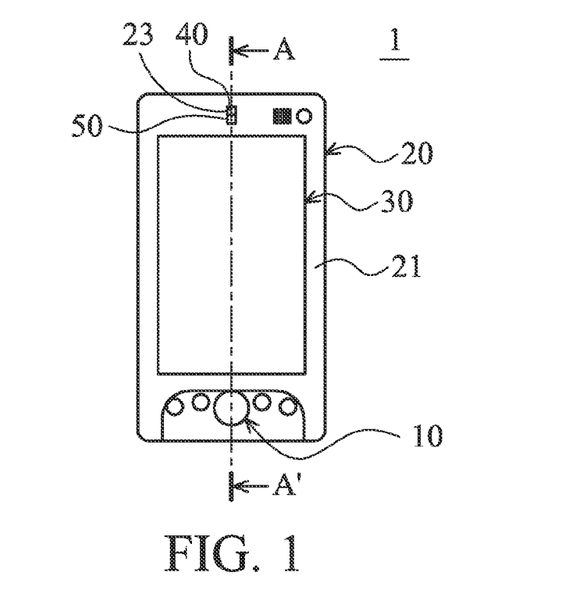
FIGS. 1 and 2 are schematic views of an electronic device of a first embodiment of the invention.
Figure 2:
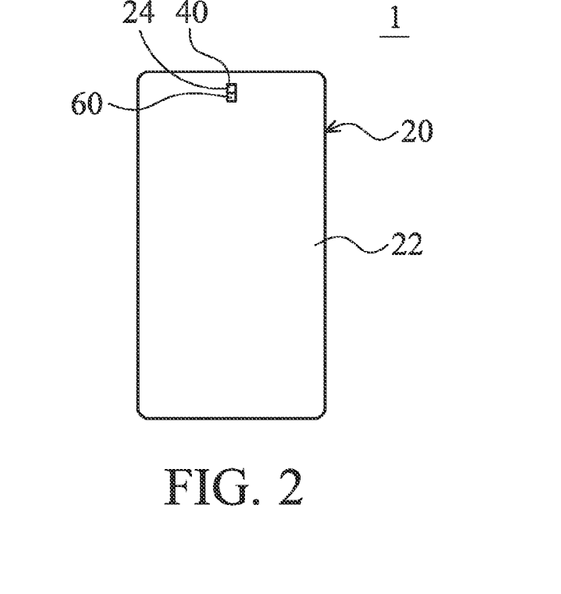

Please refer to FIGS. 1 and 2, which are schematic views of an electronic device of the invention. The electronic device 1 can be a portable electronic device, such as a mobile phone, a notebook, or a tablet computer. The electronic device 1 includes an input module 10, a housing 20, a display screen 30, and a camera module 40. The input module 10 is a keyboard, for example. The input module 10 is disposed on the housing 20. The housing 20 has a display surface 21, a rear surface 22, a first opening 23, and a second opening 24. The display surface 21 and the rear surface 22 are formed on two opposite sides of the housing 20. The first opening 23 is disposed on the display surface 21, and the second opening 24 is disposed on the rear surface 22. Namely, the first opening 23 and the second opening 24 are formed on two opposite sides of the housing 20. The display screen 30 is disposed in the housing 20 and is exposed on the display surface 21. The camera module 40 is disposed in the housing 20 and is exposed via the first opening 23 and the second opening 24.

A user may take a photograph for an object (not shown in the Figures) by the display surface 21 or the rear surface 22 of the electronic device 1 facing toward the object. For example, when the user wants video communication functions, the user can make the first opening 23 of the display surface 21 face toward the user, and the image of the user can be captured by the camera module 40. Then, the image of the user can be transmitted via the electronic device 1 and may be displayed on the display screen 30 for the user to watch. When the user wants to take a photograph, the user can make the second opening 24 of the rear surface 22 face toward the object, and the image of the object can be captured by the camera module 40. Since the display screen 30 faces toward the user, the image of the object can be displayed on the display screen 30 for the user to watch.

Figure 3:
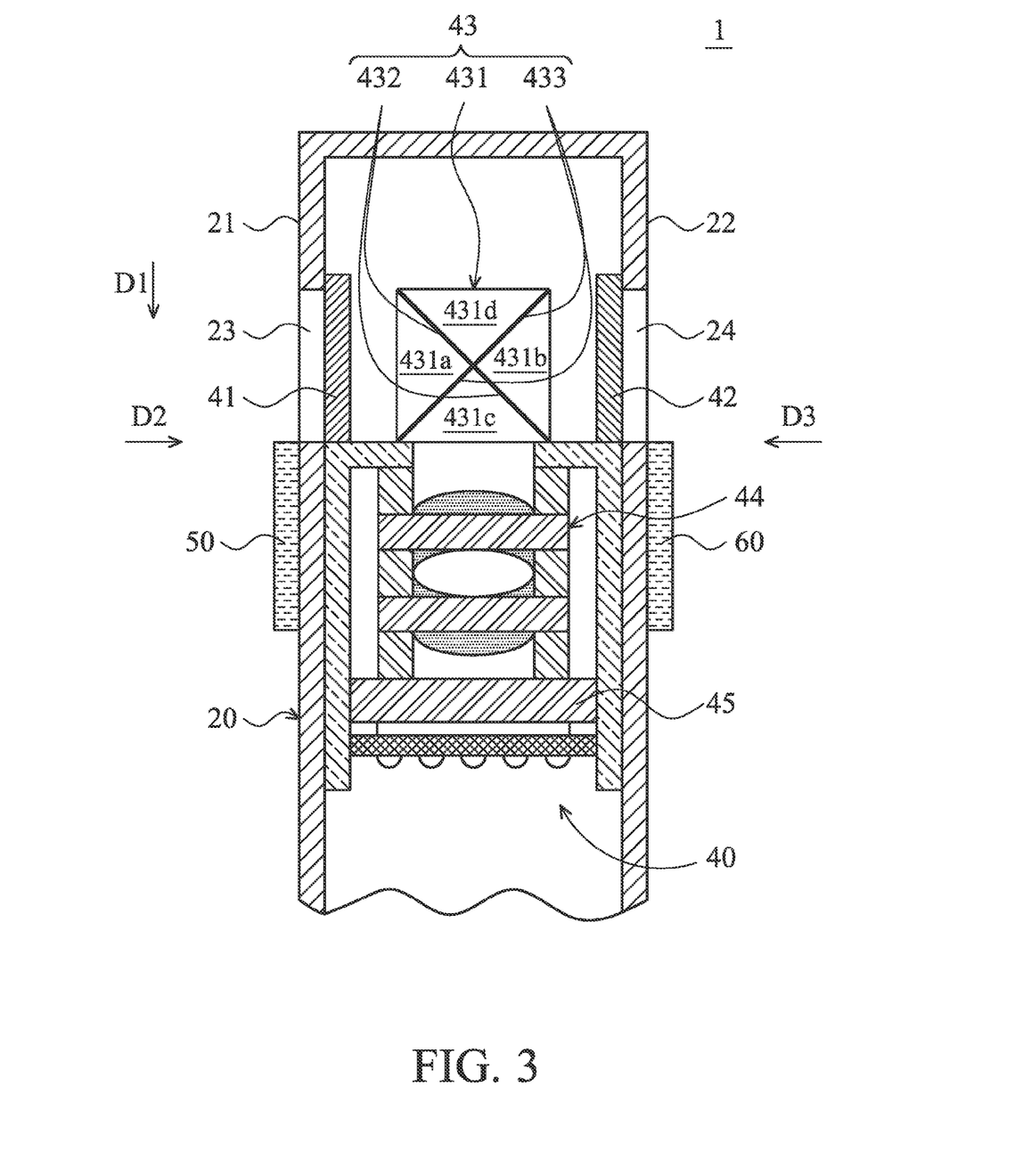
FIG. 3 is a partial cross-sectional view along the line AA' of FIG. 1.
Figure 4:
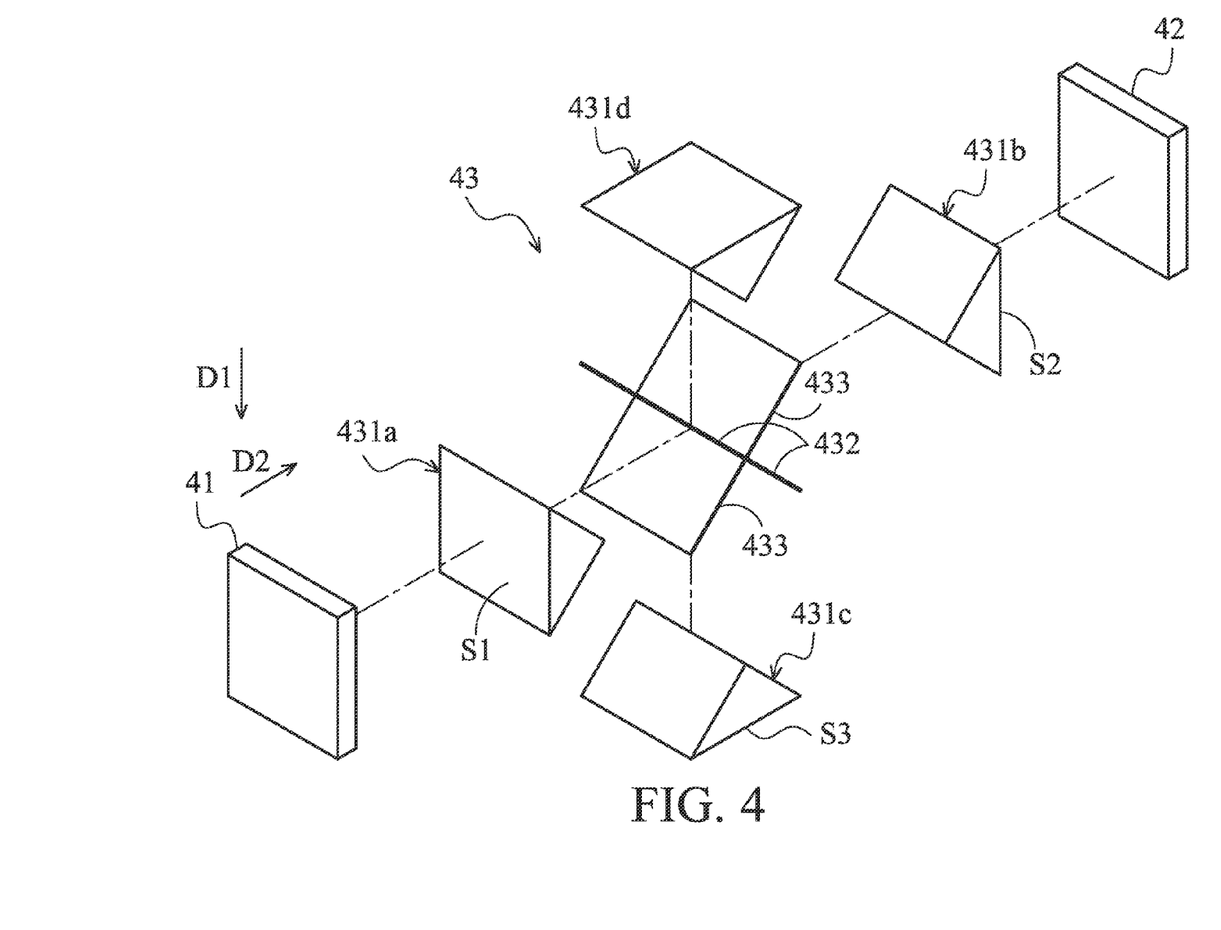
FIG. 4 is a partial exploded view of the electronic device of the first embodiment of the invention.

Please refer to FIGS. 3 and 4. FIG. 3 is a partial cross-sectional view of the electronic device 1 of the first embodiment of the invention. FIG. 4 is a partial exploded view of the electronic device 1 of the first embodiment of the invention. The display surface 21 and the rear surface 22 may be extended along a first direction D1 and be parallel to each other. The first opening 23 and the second opening 24 may be extended along the first direction D1. The electronic device 1 further includes a first covering plate 50 and a second covering plate 60. The camera module 40 includes a first polarization converter 41, a second polarization converter 42, a reflecting element 43, a lens assembly 44, and an image sensor 45.

The first polarization converter 41 is a plate structure. A light beam passing through the first polarization converter 41 can be converted to an S-polarized light beam. In general, the light beam includes an S-polarized light beam and a P-polarized light beam. The S-polarized light beam passes through the first polarization converter 41 without conversion, and the P-polarized light beam can be converted to the S-polarized light beam by the first polarization converter 41. The first polarization converter 41 is disposed in the housing 20 near the first opening 23. The first polarization converter 41 may be parallel to the display surface 21 and adjacent to the first opening 23.

The second polarization converter 42 is a plate structure. The light beam passing through the second polarization converter 42 can be converted to a P-polarized light beam. The P-polarized light beam of the light beam passes through the second polarization converter 42 without conversion, and the S-polarized light beam of the light can be converted to the P-polarized light beam by the second polarization converter 42. The second polarization converter 42 is disposed in the housing 20 near the second opening 24. The second polarization converter 42 may be parallel to the rear surface 22 and adjacent to the second opening 24. The first polarization converter 41 and the second polarization converter 42 may be extended along the first direction D1 and be parallel to each other.

Since the processes of the first polarization converter 41 and the second polarization converter 42, which convert the light beam to the S-polarized light beam or the P-polarized light beam, are known in the art, a detailed description thereof is omitted herein for the sake of brevity.

In this embodiment, the reflecting element 43 is a polarization prism. The polarization prism 43 includes a prism body 431, an S-polarized reflection membrane 432, and a P-polarized reflection membrane 433. The prism body 431 is cube-shaped or cuboid-shaped. The prism body 431 includes prism units 431a, 431b, 431c and 431d. The shapes of the prism units 431a-431d are triangular prisms. The prism units 431a-431d are assembled to the cube-shaped or cuboid-shaped prism body 431. A side surface 51 of the prism unit 431a is parallel to the first polarization converter 41, and faces to the first polarization converter 41. A side surface S2 of the prism unit 43 1b is parallel to the second polarization converter 42, and faces to the second polarization converter 42. A side surface S3 of the prism unit 431c faces to the lens assembly 44 and the image sensor 45, and is parallel to the image sensor 45.

The P-polarized light beam can pass through the S-polarized reflection membrane 432, and the S-polarized light beam can be reflected by the S-polarized reflection membrane 432. The S-polarized light beam can pass through the P-polarized reflection membrane 433, and the P-polarized light beam can be reflected by the P-polarized reflection membrane 433. Since the S-polarized reflection membrane 432 and the P-polarized reflection membrane 433 are known in the art, a detailed description thereof is omitted herein for the sake of brevity.

The S-polarized reflection membrane 432 and the P-polarized reflection membrane 433 are respectively disposed on two diagonal planes of the prism body 431, and the S-polarized reflection membrane 432 and the P-polarized reflection membrane 433 are formed to be an X structure. In the embodiment, the S-polarized reflection membrane 432 is located between the prism unit 431a and the prism unit 431d and between the prism unit 431b and the prism unit 431c. The P-polarized reflection membrane 433 is located between the prism unit 431a and the prism unit 431c, and between the prism unit 431b and the prism unit 431d.

In the embodiment, an angle between the S-polarized reflection membrane 432 and the first polarization converter 41 (or the first direction D1) is 45 degrees, and an angle between the P-polarized reflection membrane 433 and the second polarization converter 42 (or the first direction D1) is 45 degrees.

The lens assembly 44 may be assembled by a plurality of lenses. The lens assembly 44 is located between the reflecting element 43 and the image sensor 45. The image sensor 45 is a CCD (Charge-coupled Device) sensor or a CMOS (Complementary Metal-Oxide-Semiconductor) sensor. In the embodiment, only one image sensor 45 is installed in the electronic device 1 or in the camera module 40. Therefore, the manufacturing cost and the difficulty of assembly of the electronic device Tare decreased. The image sensor 45 is disposed in the housing 20. The image sensor 45 is perpendicular to the first direction D1. The first covering plate 50 and the second covering plate 60 are movably disposed on the housing 20, respectively.

Figure 5:
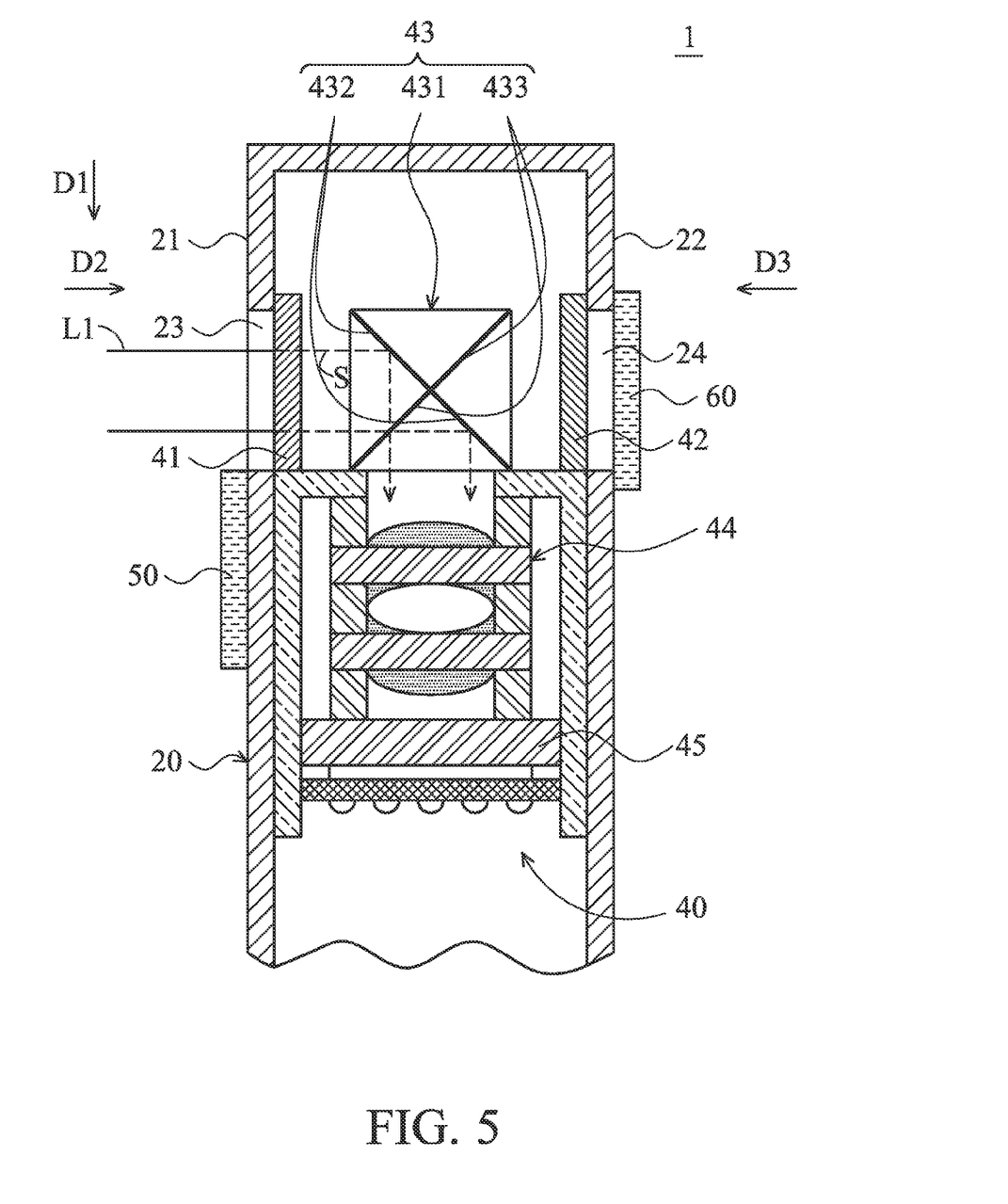
FIGS. 5 and 6 are partial cross-sectional views along the line AA' of FIG. 1.

Please refer to FIG. 5, which is a partial cross-sectional view of the electronic device 1 of the first embodiment of the invention. In FIG. 5, the first opening 23 is not covered by the first covering plate 50, and the second opening 24 is covered by the second covering plate 60. The user can make the display surface 21 of the electronic device 1 face toward an object, and photograph the object by the electronic device 1. The light beam L1 may be emitted to the first polarization converter 41 via the first opening 23 along a second direction D2, since the first opening 23 is not covered by the first covering plate 50. The second direction D2 is perpendicular to the first direction D1. The light beam L1 is converted to an S-polarized light beam S by the first polarization converter 41. Next, the S-polarized light beam S is emitted to the polarization prism 431.

Since the S-polarized light beam S can pass through the P-polarized reflection membrane 433, the S-polarized light beam S can be emitted to the S-polarized reflection membrane 432, and are reflected to the lens assembly 44 by the S-polarized reflection membrane 432 along the first direction D1. Finally, the S-polarized light beam S passes through the lens assembly 44, and then is emitted to the image sensor 45. The S-polarized light beam S is adjusted by the lens assembly 44, and thus the image sensor 45 can capture a clear image.

Figure 6:
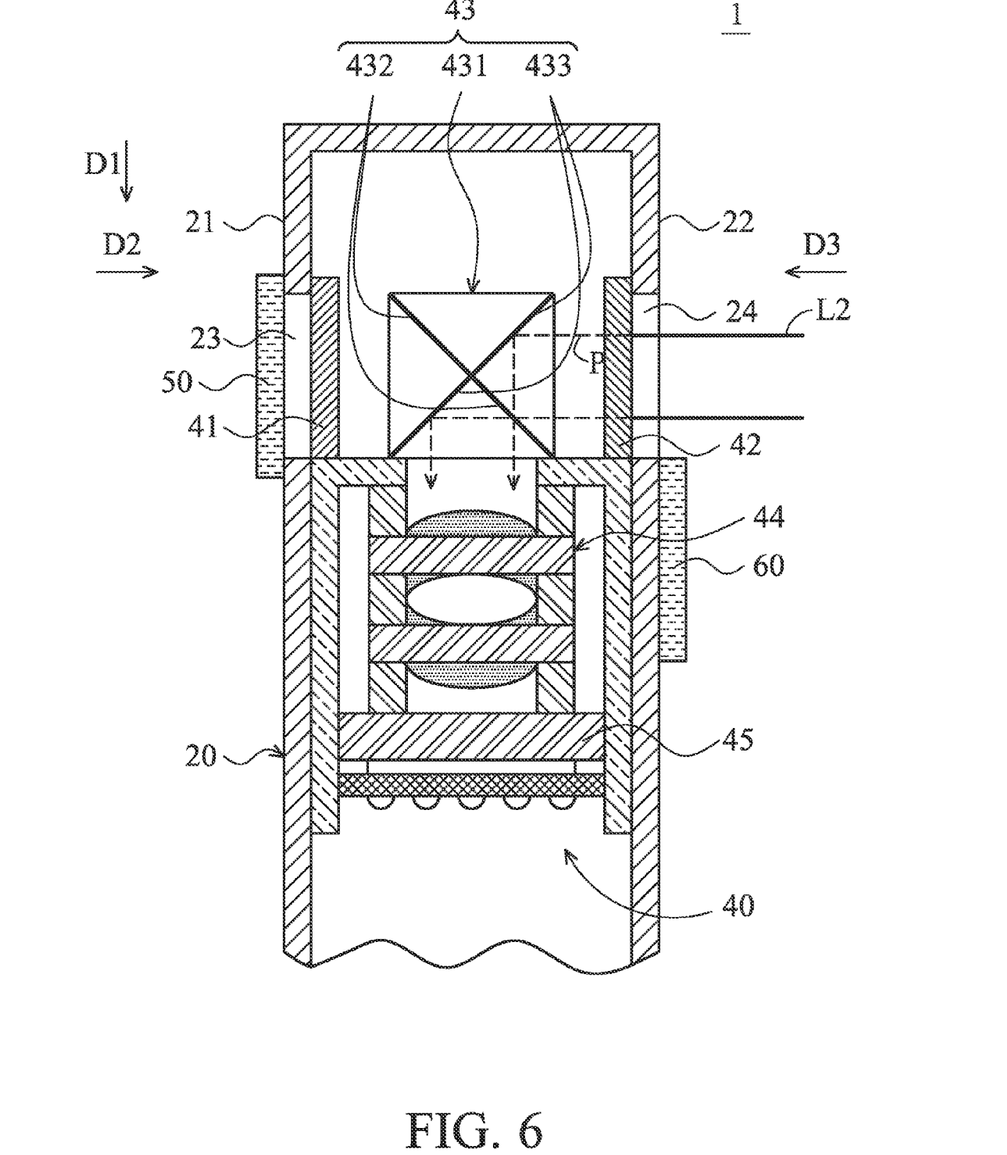

Please refer to FIG. 6, which is a partial cross-sectional view of the electronic device 1 of the first embodiment of the invention. In FIG. 6, the first opening 23 is covered by the first covering plate 50, and the second opening 24 is not covered by the second covering plate 60. A user can make the rear surface 22 of the electronic device 1 face toward an object, and photograph the object by the electronic device 1. The light beam L2 may be emitted to the second polarization converter 42 via the second opening 24 along a third direction D3, since the second opening 24 is not covered by the second covering plate 60. The third direction D3 is an opposite direction of the second direction D2. The light beam L2 is converted to a P-polarized light beam P by the second polarization converter 42. Next, the P-polarized light beam P is emitted to the polarization prism 431.

Since the P-polarized light beam P can pass through the S-polarized reflection membrane 432, the P-polarized light beam P can be emitted to the P-polarized reflection membrane 433, and are reflected to the lens assembly 44 by the P-polarized reflection membrane 433 along the first direction D1. Finally, the P-polarized light beam P passes through the lens assembly 44 and then is emitted to the image sensor 45. The P-polarized light beam P is adjusted by the lens assembly 44, and thus the image sensor 45 can capture a clear image.

Figure 7:
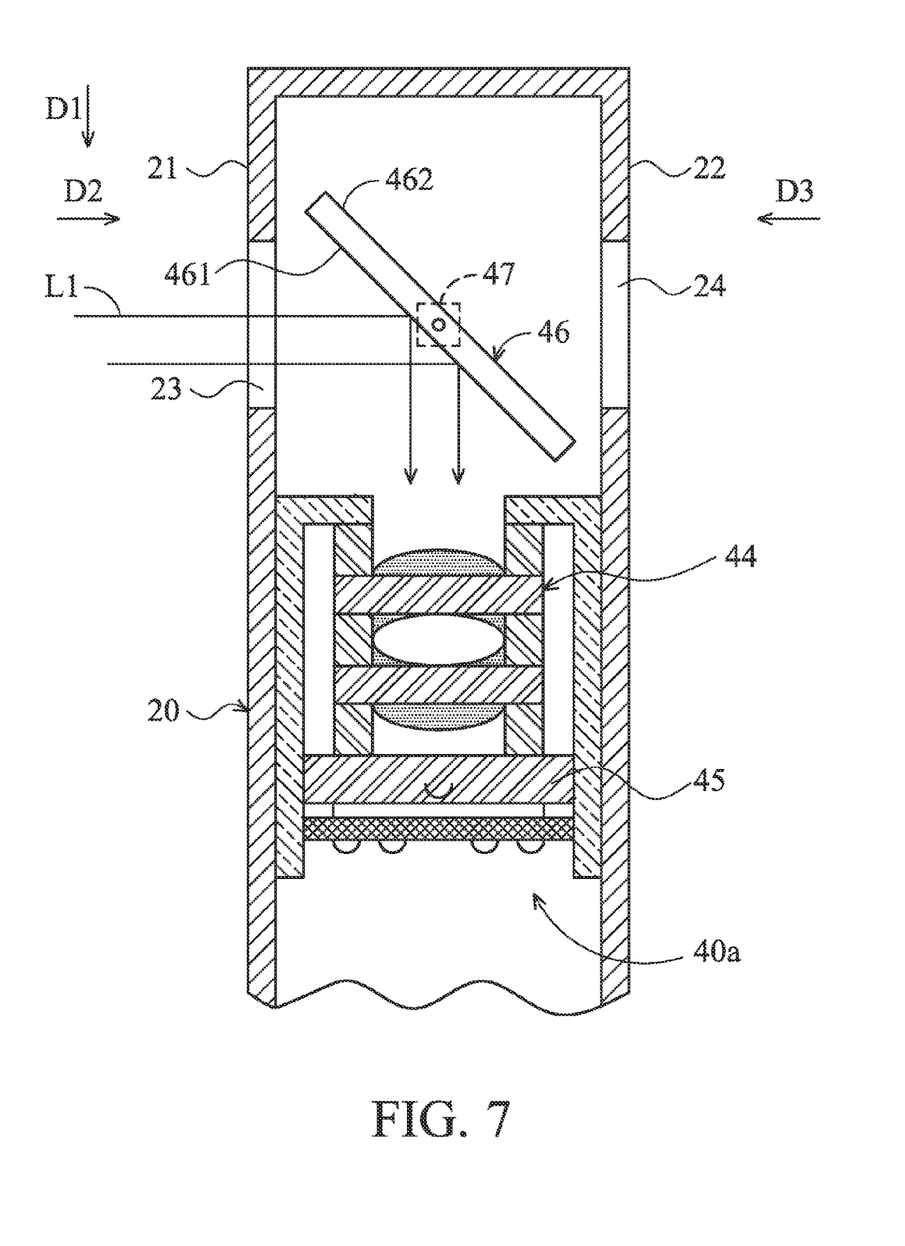
FIGS. 7 and 8 are partial cross-sectional views, which is along the line AA' of FIG. 1, of the electronic device of a second embodiment of the invention.
Figure 8:
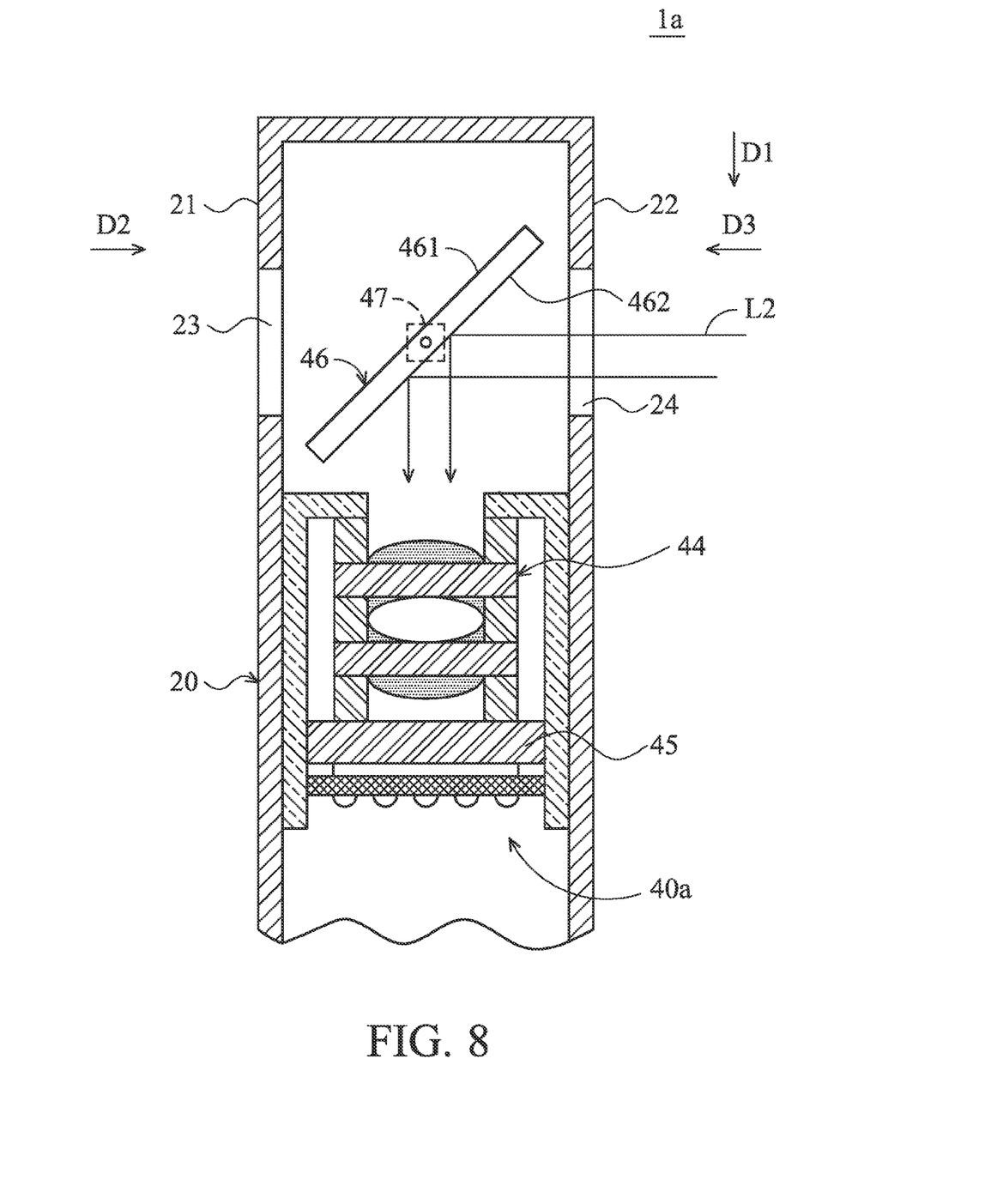

Please refer to FIGS. 7 and 8, which are partial cross-sectional views of the electronic device 1a of a second embodiment of the invention. The differences between the second embodiment and the first embodiment are described as following. In the second embodiment, the reflecting element 46 is a reflecting mirror. The reflecting element 46 does not include the prism body 431, the S-polarized reflection membrane 432, and the P-polarized reflection membrane 433 as in the first embodiment. The camera module 40a does not include the first polarization converter 41 and second polarization converter 42 as in the first embodiment.

The reflecting mirror 46 is a plate structure, and rotatably located between the first opening 23 and the second opening 24. In this embodiment, the electronic device 1a further includes a motor 47 disposed in the housing 20. The reflecting mirror 46 is disposed on the motor 47 and rotated by the motor 47. The reflecting mirror 46 includes a first reflecting surface 461, and a second reflecting surface 462 opposite to the first reflecting surface 461. In FIG. 7, when an angle between the reflecting mirror 46 and the first direction D1 is 45 degrees, the first reflecting surface 461 faces to the first opening 23, the lens assembly 44, and the image sensor 45. The light beam L1 is emitted to the reflecting mirror 46 along the second direction D2, and the reflecting mirror 46 reflects the light beam L1 to the image sensor 45 along the first direction D1 by passing through the lens assembly 44.

In FIG. 8, when an angle between the reflecting mirror 46 and the first direction D1 is 45 degrees, the second reflecting surface 462 faces to the second opening 24, the lens assembly 44, and the image sensor 45. The light beam L2 is emitted to the reflecting mirror 46 along the third direction D2, and the reflecting mirror 46 reflects the light beam L2 to the image sensor 45 along the first direction D1 by passing through the lens assembly 44. The light beams L1 and L2 are adjusted by the lens assembly 44, and thus the image sensor 45 can capture a clear image.

In conclusion, a user can take a photograph for an object by the display surface or the rear surface of the electronic device facing toward the object. Since the electronic device has only one camera module, the manufacturing cost and the difficulty of assembly may be decreased, and the product yield rate may be increased.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with camera functions, comprising:
 a housing comprising a first opening and a second opening; and
 a camera module, disposed in the housing, comprising;
 a first polarization converter, adjacent to the first opening, converting a first light beam to an S-polarized light beam;
 a second polarization converter, adjacent to the second opening, converting a second light beam to a P-polarized light beam;
 a reflecting element, disposed between the first polarization converter and the second polarization converter; and
 an image sensor disposed in the housing,
 wherein the reflecting element reflects the S-polarized light beam and the P-polarized light beam to the image sensor,
 wherein the reflecting element is a polarization prism, comprising a prism body, a S-polarized reflection membrane, and a P-polarized reflection membrane,
 wherein the S-polarized reflection membrane and the P-polarized reflection membrane are respectively disposed on two diagonal planes of the prism body, and the S-polarized reflection membrane and the P-polarized reflection membrane are formed to be an X structure.

2. The electronic device with camera functions as claimed in claim 1, further comprising a first covering plate and a second covering plate movably disposed on the housing, wherein when the second opening is covered by the second covering plate, the first light beam is emitted to the first polarization converter via the first opening, and when the first opening is covered by the first covering plate, the second light beam is emitted to the second polarization converter via the second opening.

3. The electronic device with camera functions as claimed in claim 1, wherein the camera module comprises a lens assembly disposed between the reflecting element and the image sensor, and the reflecting element reflects the S-polarized light beam and the P-polarized light beam to the image sensor by passing through the lens assembly.

4. The electronic device with camera functions as claimed in claim 1, wherein the first opening is positioned on a first side of the housing, and the second opening is positioned on a second side of the housing opposite to the first side.

5. An electronic device with camera functions, comprising:
 a housing comprising a first opening and a second opening; and
 a camera module, disposed in the housing, comprising;
 a reflecting element, rotatably disposed between the first opening and the second opening, comprising a first reflecting surface and a second reflecting surface opposite to the first reflecting surface; and
 an image sensor disposed in the housing,
 wherein a first light beam is emitted to the reflecting element via the first opening, and a second light beam is emitted to the reflecting element via the second opening, and when the first reflecting surface of the reflecting element faces to the first opening and the image sensor, the reflecting element reflects the first light beam to the image sensor, and when the second reflecting surface of the reflecting element faces to the second opening and the image sensor, the reflecting element reflects the second light beam to the image sensor,
 wherein the first reflecting surface is substantially parallel to the second reflecting surface.

6. The electronic device with camera functions as claimed in claim 5, wherein the reflecting element is a reflecting mirror.

7. The electronic device with camera functions as claimed in claim 5, wherein the camera module comprises a lens assembly disposed between the reflecting element and the image sensor, and the reflecting element reflects the first light beam to the image sensor by passing through the lens assembly, and the reflecting element reflects the second light beam to the image sensor by passing through the lens assembly.

8. The electronic device with camera functions as claimed in claim 5, wherein the first opening is positioned on a first side of the housing, and the second opening is positioned on a second side of the housing opposite to the first side.

* * * * *